United States Patent
Jung

(10) Patent No.: US 12,302,009 B2
(45) Date of Patent: May 13, 2025

(54) IMAGING DEVICE AND IMAGING METHOD

(71) Applicant: LG INNOTEK CO., LTD., Seoul (KR)

(72) Inventor: Jee Hoon Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 47 days.

(21) Appl. No.: 17/925,104

(22) PCT Filed: May 13, 2021

(86) PCT No.: PCT/KR2021/006017
§ 371 (c)(1),
(2) Date: Nov. 14, 2022

(87) PCT Pub. No.: WO2021/230683
PCT Pub. Date: Nov. 18, 2021

(65) Prior Publication Data
US 2023/0232121 A1    Jul. 20, 2023

(30) Foreign Application Priority Data
May 13, 2020   (KR) ..................... 10-2020-0057333

(51) Int. Cl.
*H04N 23/80*     (2023.01)
*G06T 3/4046*    (2024.01)
(Continued)

(52) U.S. Cl.
CPC ......... *H04N 23/815* (2023.01); *G06T 3/4046* (2013.01); *G06T 3/4053* (2013.01); *H04N 23/84* (2023.01)

(58) Field of Classification Search
None
See application file for complete search history.

(56) References Cited

U.S. PATENT DOCUMENTS 5,886,740 A * 3/1999 Nagata ................. H04N 9/646
                                                    348/265
2003/0133605 A1 * 7/2003 Tannhof ............... G06T 3/4046
                                                    382/156
(Continued)

FOREIGN PATENT DOCUMENTS

KR     10-1791573     10/2017
KR  10-2018-0122548   11/2018
(Continued)

OTHER PUBLICATIONS

International Search Report dated Aug. 18, 2021 issued in Application No. PCT/KR2021/006017.
(Continued)

*Primary Examiner* — Mark T Monk
(74) *Attorney, Agent, or Firm* — KED & ASSOCIATES, LLP

(57) ABSTRACT

An imaging device, according to one embodiment of the present invention, comprises: an input unit for receiving first Bayer data having a first resolution and a noise level; and a convolutional neural network for outputting second Bayer data having a second resolution by using the noise level and the first Bayer data.

20 Claims, 10 Drawing Sheets

(51) Int. Cl.
    *G06T 3/4053*     (2024.01)
    *H04N 23/84*     (2023.01)

(56) References Cited

U.S. PATENT DOCUMENTS

| | | | | |
|---|---|---|---|---|
| 2012/0275690 | A1* | 11/2012 | Melvin | G06V 10/95 |
| | | | | 382/156 |
| 2018/0315155 | A1* | 11/2018 | Park | G06V 10/454 |
| 2019/0122689 | A1* | 4/2019 | Jain | H04R 1/406 |
| 2019/0336095 | A1* | 11/2019 | Ritter | G06T 7/11 |
| 2020/0042796 | A1 | 2/2020 | Kim et al. | |
| 2020/0097772 | A1* | 3/2020 | Nakanishi | G06V 20/56 |

FOREIGN PATENT DOCUMENTS

| | | |
|---|---|---|
| KR | 10-2019-0094133 | 8/2019 |
| KR | 10-2019-0110965 | 10/2019 |
| KR | 10-2020-0012416 | 2/2020 |

OTHER PUBLICATIONS

Korean Office Action dated May 22, 2024 issued in Application No. 10-2020-0057333.

\* cited by examiner

【FIG.1】
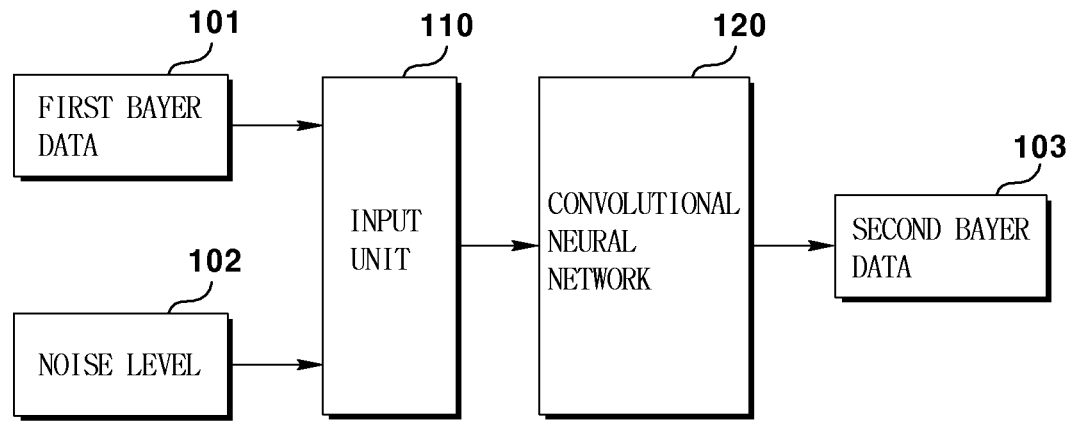
【FIG. 2】
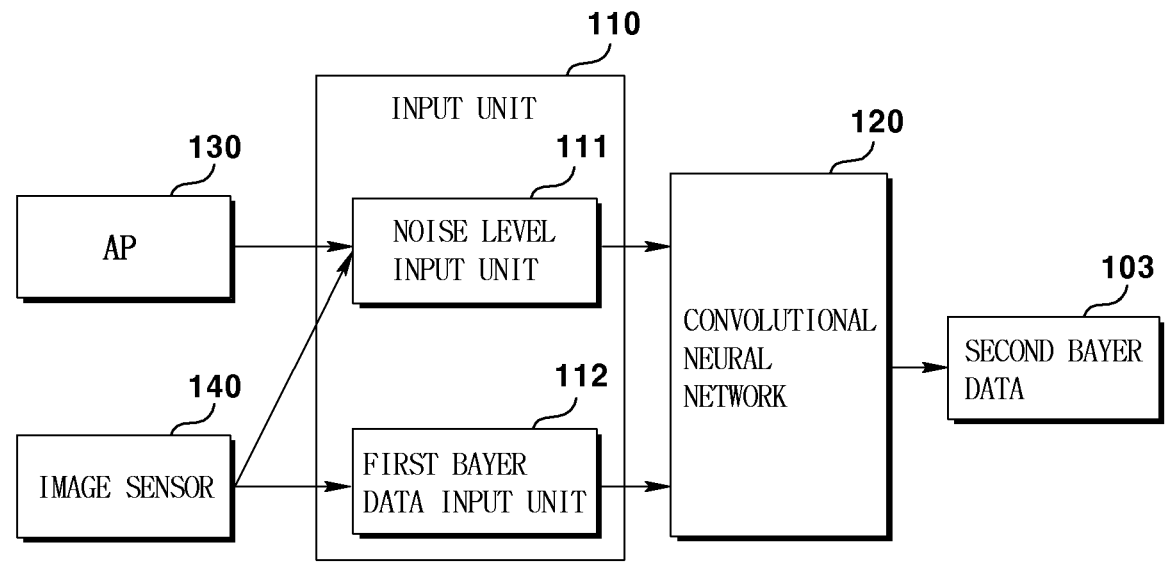

[FIG. 3]
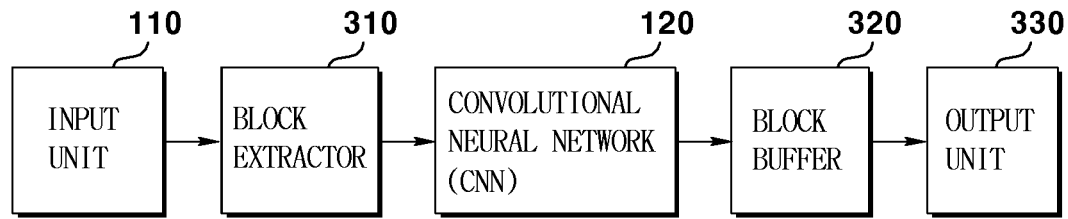
[FIG. 4]
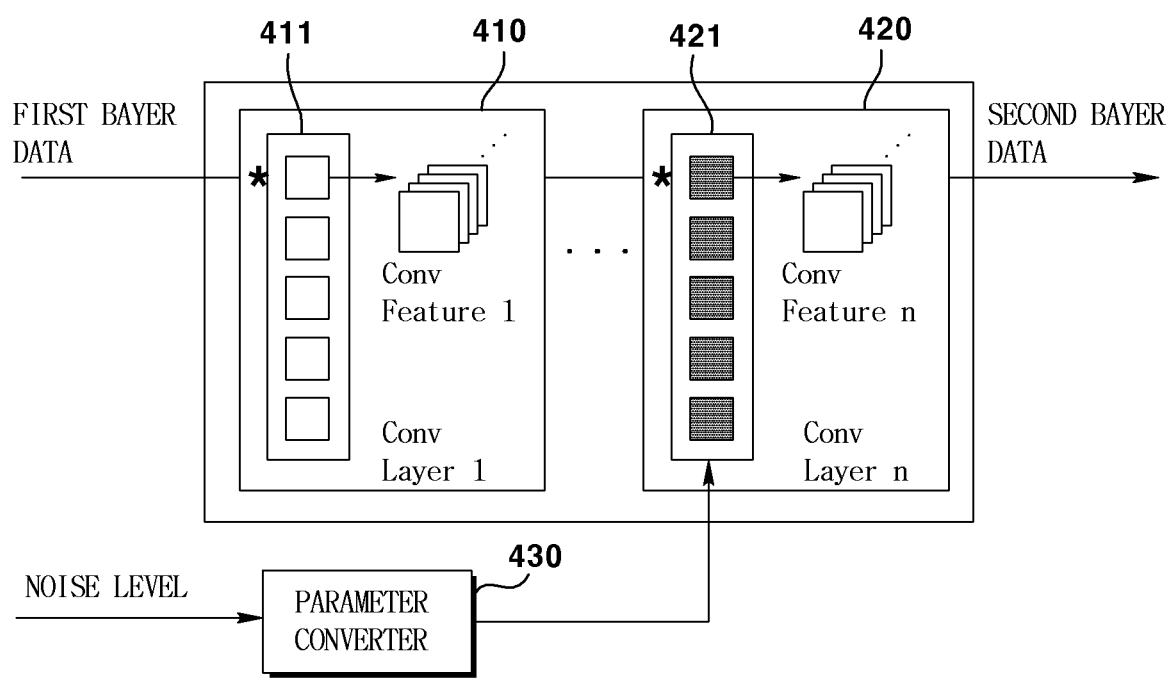

[FIG. 5]
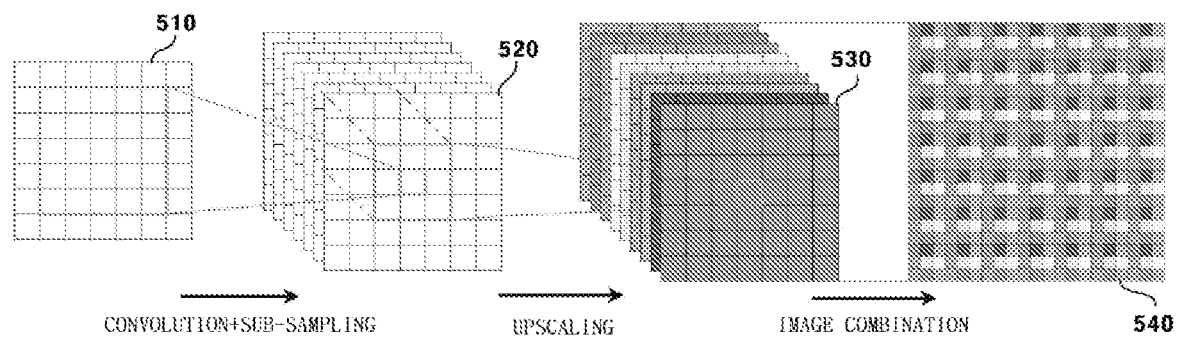
[FIG. 6]
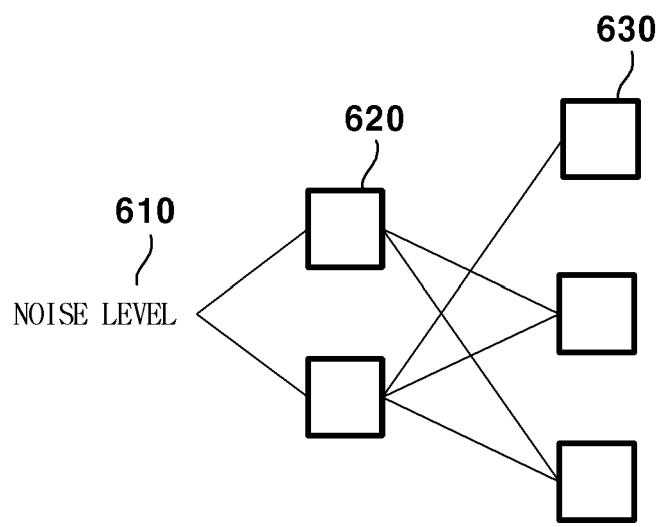

[FIG. 7]
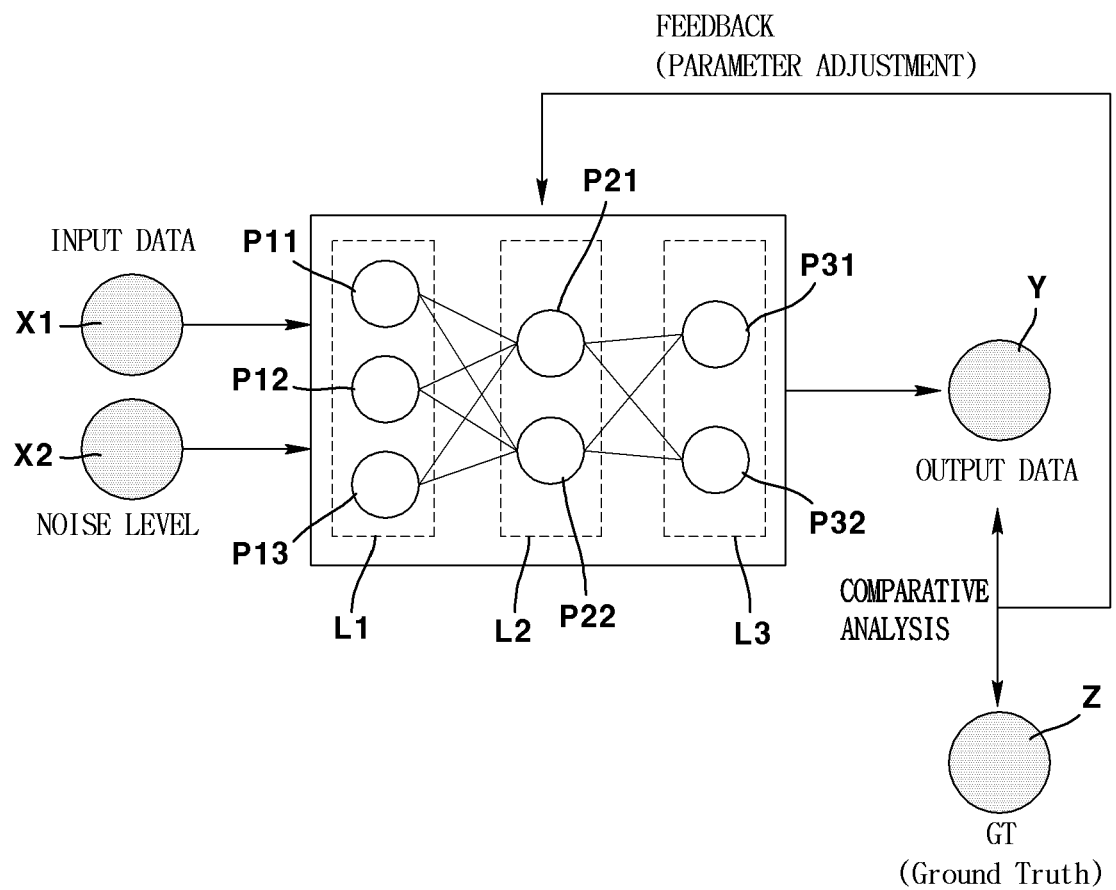

[FIG. 8]
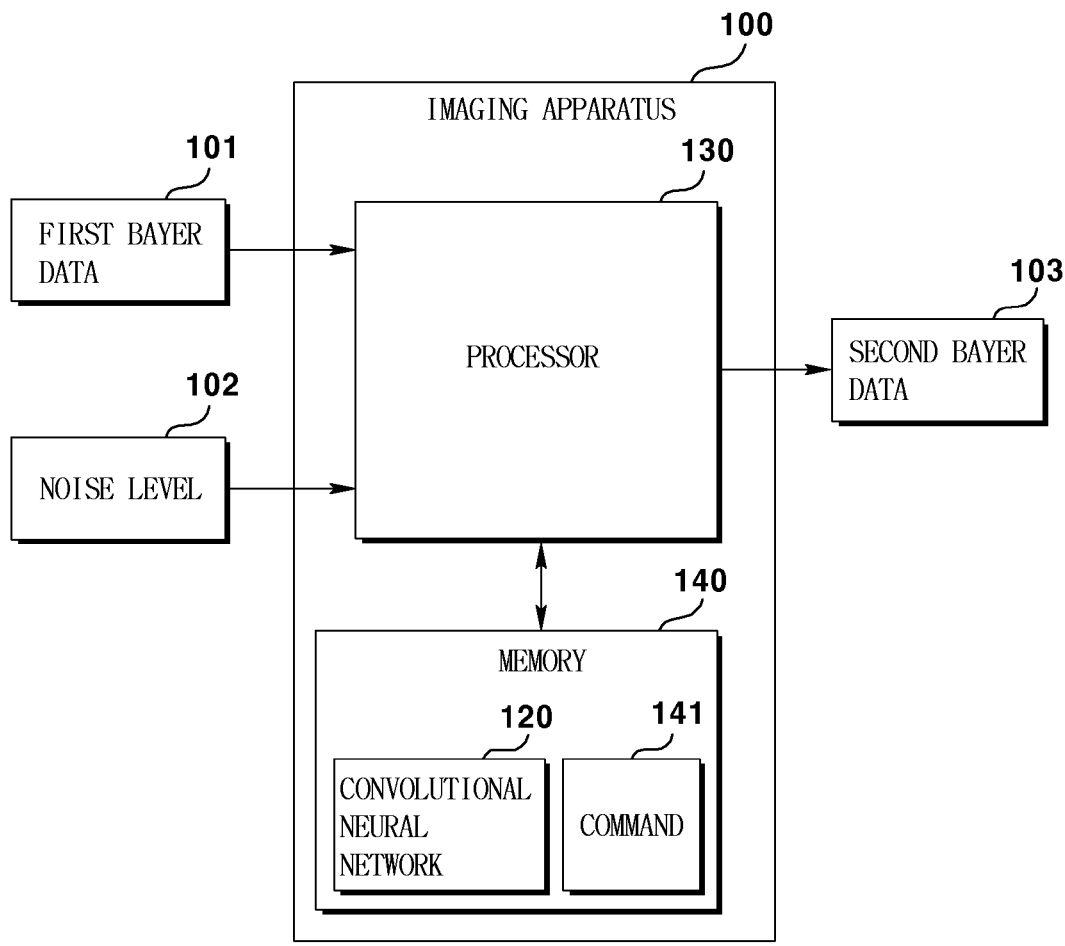
[FIG. 9]
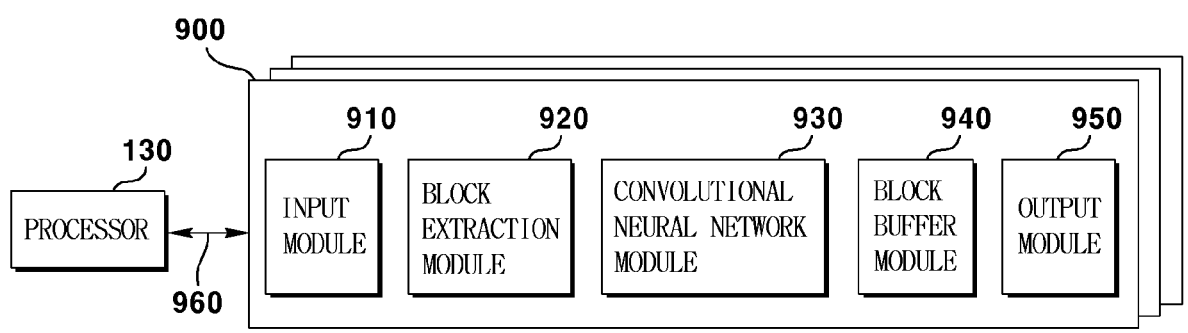

[FIG. 10]
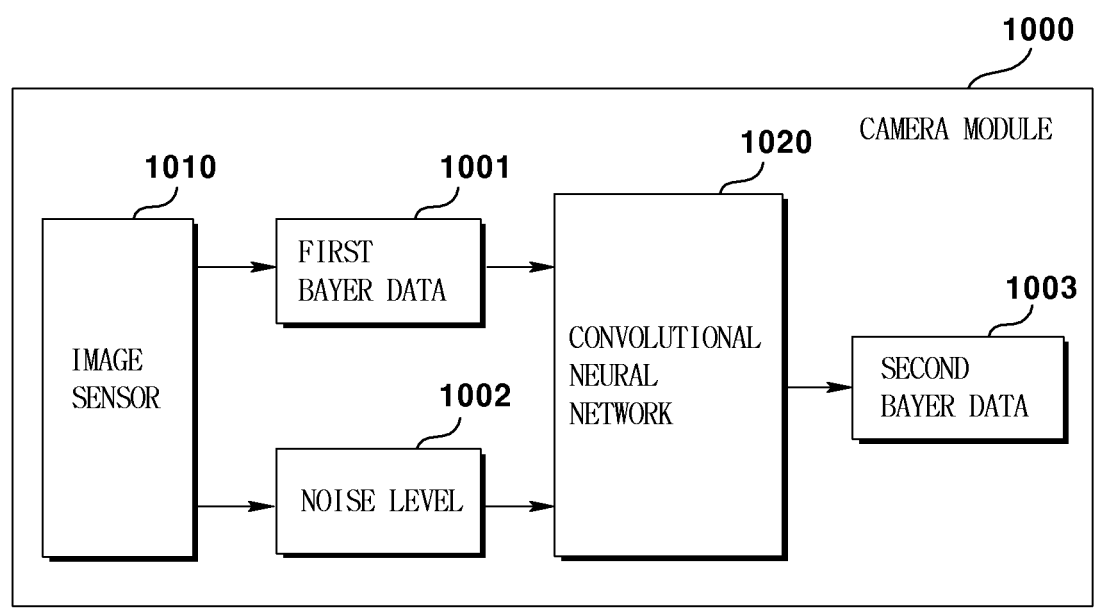

[FIG. 11]
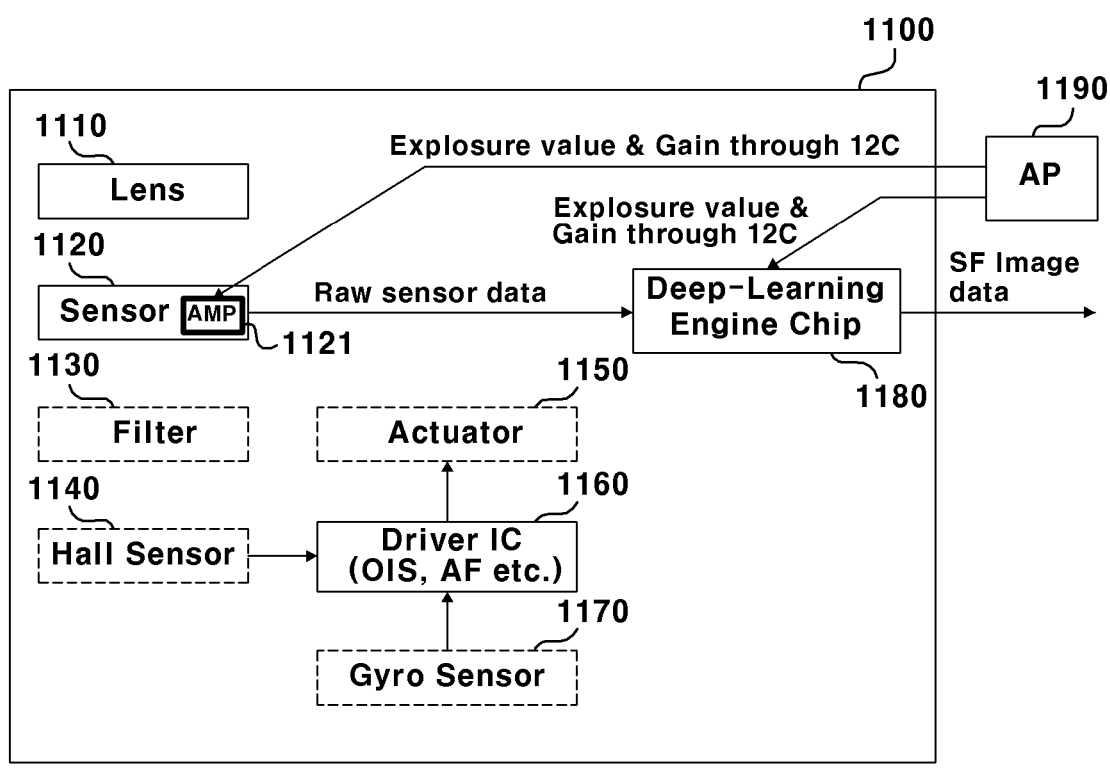

[FIG. 12]
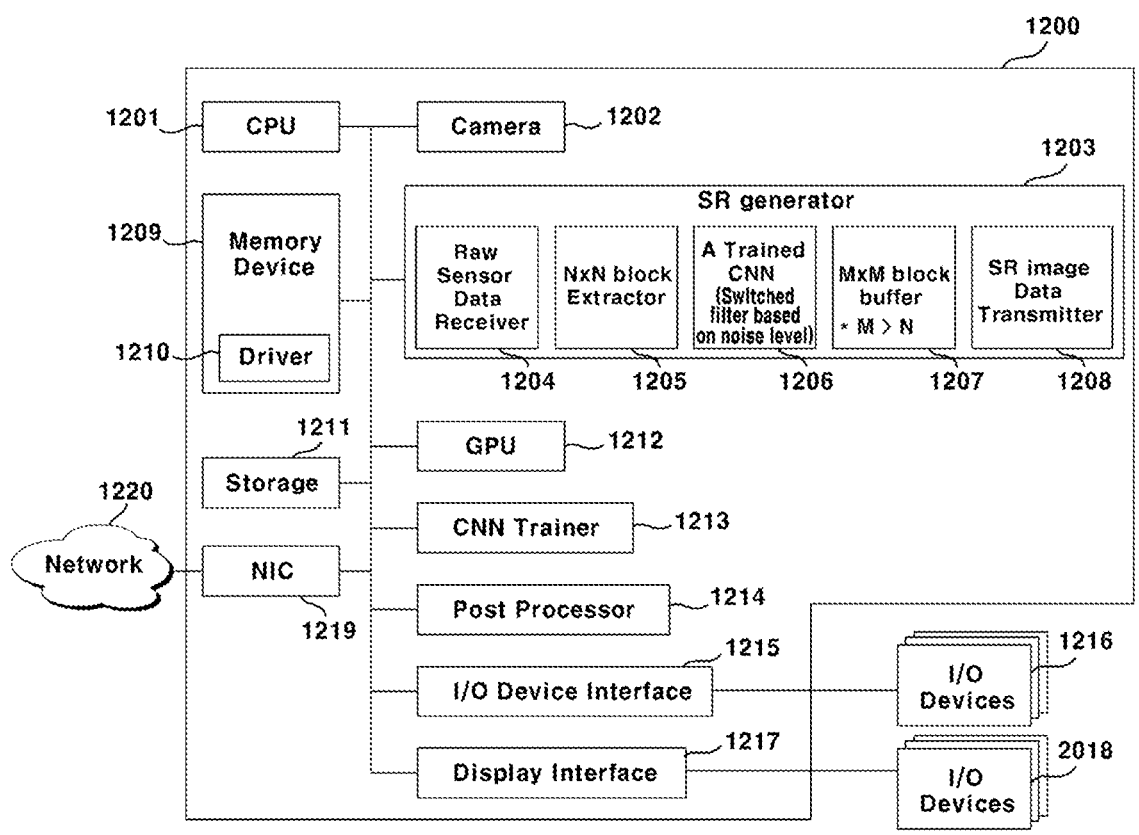

[FIG. 13]
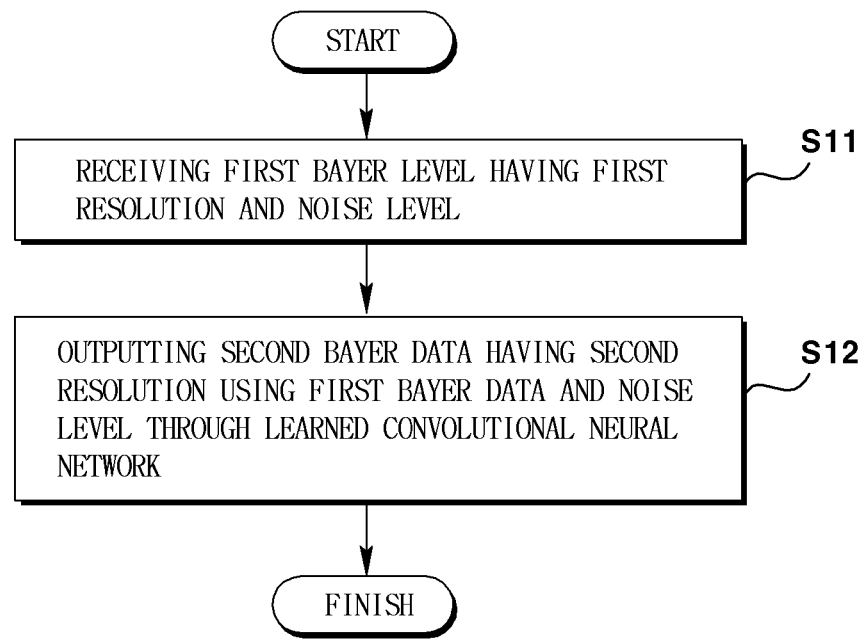

【FIG. 14】
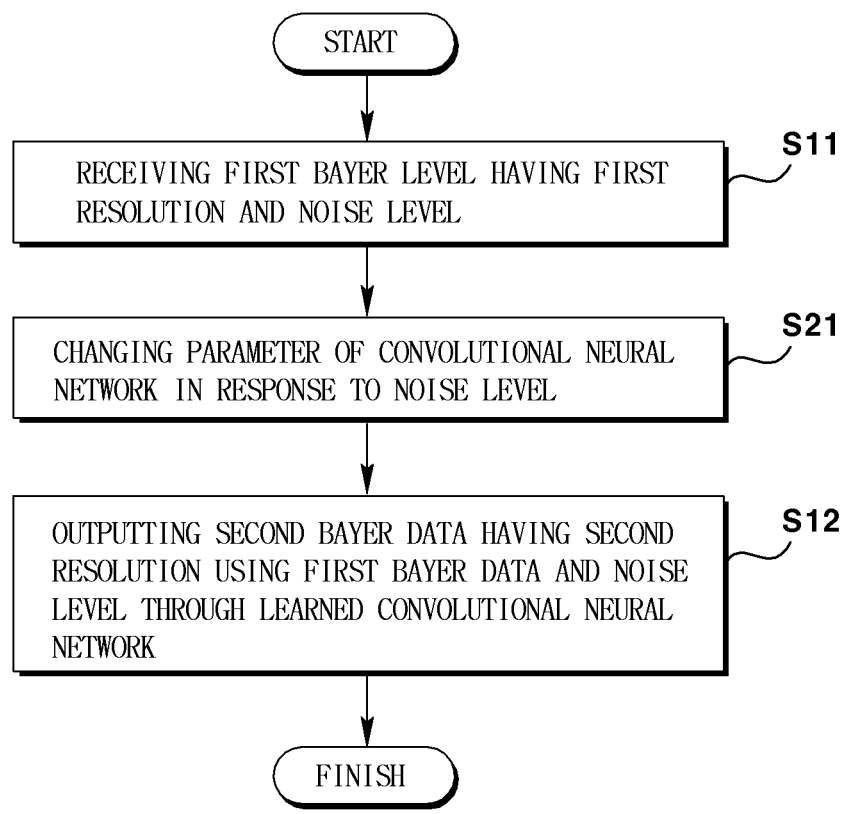

IMAGING DEVICE AND IMAGING METHOD

CROSS-REFERENCE TO RELATED PATENT APPLICATIONS

This application is a U.S. National Stage Application under 35 U.S.C. § 371 of PCT Application No. PCT/KR2021/006017, filed May 13, 2021, which claims priority to Korean Patent Application No. 10-2020-0057333, filed May 13, 2020, whose entire disclosures are hereby incorporated by reference.

TECHNICAL FIELD

The teachings in accordance with exemplary and non-limiting embodiments of this invention generally relate to an imaging apparatus, and more particularly, to an imaging apparatus, an image sensor module and an imaging method for generating a high resolution data from a low resolution data by adaptively performing a deep learning to a noise level.

BACKGROUND ART

Concomitant with miniaturization of camera modules as technologies are developed, the small-sized camera modules are used by being applied to various IT devices including, but not limited to, smart phones, portable phones, PDAs and the like. The said camera modules are manufactured using image sensors as essential parts of CCDs or CMOSs, and are so manufactured as to allow a focus-adjusting in order to adjust the size of image.

Meantime, as an image with a high resolution is enabled concomitant with technology development, demands are also increased on technologies that can embody an image that has captured a distant object with a high resolution.

Generally, a camera is mounted with a zoom function for capturing a distant object, where the zoom function is largely divided to an optical zoom method enlarging an object by actually moving a lens inside a camera, and a digital zoom method obtaining a zoom effect by enlarging and displaying a part of screen of an object-captured image data in a digital processing method.

Although the optical zoom method obtaining an image to an object by using the movement of lens can obtain an image having a relatively high resolution, the optical zoom method suffers from problems of increased cost due to addition of parts and of complicated structure inside the camera. Furthermore, there is a limit in an area for enlarging an object by using the optical zoom method, to which technologies are developed to offset the problems using software.

In addition to the abovementioned methods, technologies capable of embodying a highly resolving image by generating more pixel information using methods by shaking parts inside the camera are existent that include: a sensor shifting method that shakes a sensor using a VCM (Voice Coil Motor) or an MEMS (Micro-Electro Mechanical Systems) technology; an OIS (Optical Image Stabilizer) technology obtaining pixel information by shaking a lens using VCM; and a technology shaking a filter between a sensor and a lens.

However, the disadvantages of these technologies are that phenomenon such as motion blurs or artifacts can be generated due to synthesis of data of various lags when moving objects are captured to thereby result in degraded image quality.

Furthermore, other disadvantages are that complex devices are inserted into a camera in order to embody the said objects to thereby enlarge the size of camera module, and it is difficult to install on a camera-mounted vehicle due to the method of shaking the parts to thereby limit the use only in a fixed environment.

Meanwhile, technologies for embodying a high resolution using software algorithm generally used in TVs may include a SR (Single-Frame Super Resolution) technology or an SR (Multi-frame Super Resolution) technology.

Although these technologies do not generate artifact problems, they are algorithms difficult to be applied to devices applicable with small camera modules such as mobile devices, vehicles and/or IoTs, and, as a result, difficult problems exist that cannot be embodied unless separate image processors are mounted in order to implement these technologies.

Still furthermore, there is another problem of degraded performances due to noise levels while environmental information such as noise levels are not reflected when same methods are used in implementing the SR.

DETAILED DESCRIPTION OF THE INVENTION

Technical Subject

The present invention is directed to cope with the above-mentioned problems/disadvantages and the present invention is to provide an imaging apparatus, an image sensor module and an imaging method for generating a high resolution data from a low resolution data by adaptively performing a deep learning to a noise level.

Technical Solution

In one general aspect of the present invention, there may be provided an image apparatus according to an exemplary embodiment of the present invention, the apparatus comprising: an input unit for receiving first Bayer data having a first resolution and a noise level; and a convolutional neural network for outputting second Bayer data having a second resolution by using the noise level and the first Bayer data.

Preferably, but not necessarily, the first Bayer data and the noise level may be respectively inputted to the convolutional neural network.

Preferably, but not necessarily, the first Bayer data may be a data outputted from an image sensor.

Preferably, but not necessarily, the data outputted from the image sensor may be a data amplified based on the noise level.

Preferably, but not necessarily, the noise level may be inputted from the image sensor or an AP (Application Processor).

Preferably, but not necessarily, the convolutional neural network may be so learned as to output a second Bayer data having a second resolution based on the first Bayer data and the noise level.

Preferably, but not necessarily, a training set of the convolutional neural network may include a first Bayer data having a predetermined noise level, a relevant noise level and a first resolution, and a second Bayer data having a second resolution.

Preferably, but not necessarily, the second resolution may be higher than the first resolution.

Preferably, but not necessarily, noise of second Bayer data may be smaller than noise of the first Bayer data.

In another general aspect of the present invention, there may be provided an image apparatus, the apparatus comprising: at least one processor; and a memory storing a command processed by the processor, wherein the processor receiving a first Bayer data having a first resolution and a noise level in response to the command stored in the memory, and outputting a second Bayer data having a second resolution using the first Bayer data and the noise level using a learned convolutional neural network.

In still another general aspect of the present invention, there may be provided a camera module, the camera module comprising: an image sensor generating a first Bayer data having a first resolution in response to noise level; and a convolutional neural network outputting a second Bayer data having a second resolution using the first Bayer data and the noise level.

In still another general aspect of the present invention, there may be provided an imaging method of an imaging apparatus including at least one processor and a memory storing a command processed by the processor, the method comprising: receiving a first Bayer data having a first resolution and a noise level; and outputting a second Bayer data having a second resolution using the first Bayer data and the noise level through a learned convolutional neural network.

Advantageous Effects

Teachings in accordance with the exemplary embodiments of this invention have an advantageous effect in that a high resolution data can be generated from a low resolution data by adaptively performing a deep learning to a noise level. In generating a high resolution data, a digital zoom is performed by increasing the resolution of Bayer data which is not an RGB image but a raw data, whereby a high resolution image having a high image quality can be obtained due to abundant information amount when compared with a case of increasing a resolution relative to an RGB image.

Furthermore, an RGB image having an excellent image quality under a low illuminance environment can be obtained, and a resolution of RGB image can be increased and at the same time, an RGB image improved in image quality can be generated.

Furthermore, the high resolution data may be realized using relatively small-sized chips because the high resolution data is realized by a method using only several line buffers, and the high resolution image is generated using a network configuration optimizing method, whereby the present invention may be mounted on various positions using various methods depending on use purposes of mounted devices to thereby increase the degree of freedom in design.

Still furthermore, more economically higher resolution images may be generated because a high priced processor can be dispensed with in order to perform an algorithm of preexisting deep learning method.

Still furthermore, the present invention may be implemented using a method mountable on any place of image sensor module, camera module and/or AP module, such that the continuous zoom function may be used by applying the present invention to various preexisting modules including the zoom function-less camera module and/or the camera module that supports only a fixed zoom relative to a particular magnification.

Furthermore, still another advantage may be that a camera module that supports only an optically continuous zoom relative to a particular magnification may be applied with the present technologies to allow utilizing a continuous zoom function over a broader magnification section.

BRIEF DESCRIPTION OF DRAWINGS

FIG. 1 illustrates an imaging process according to an exemplary embodiment of the present invention.

FIGS. 2 to 7 illustrate schematic diagrams for explaining an imaging process according to an exemplary embodiment of the present invention.

FIG. 8 is a block diagram of an imaging apparatus according to an exemplary embodiment of the present invention.

FIG. 9 is a block diagram of elements stored in a recording medium according to an exemplary embodiment of the present invention.

FIG. 10 is a block diagram of a camera module according to an exemplary embodiment of the present invention.

FIGS. 11 and 12 are schematic drawings for explaining various devices applied with a processor according to an exemplary embodiment of the present invention.

FIG. 13 is a flowchart of an imaging method according to an exemplary embodiment of the present invention.

FIG. 14 is a flowchart of an imaging method according to another exemplary embodiment of the present invention.

BEST MODE

Hereinafter, exemplary embodiments of the present invention will be described in detail with reference to the accompanying drawings.

However, the technical ideas of the present invention are not limited to part of the exemplary embodiments that are explained but may be embodied by mutually different forms, and one or more elements among the exemplary embodiments may be used by being selectively coupled or substituted as long as within the technical scope of the present invention.

Unless otherwise defined, all terms (including technical or scientific terms) used herein have the same meaning as commonly understood by one of ordinary skill in the art to which the disclosure pertains. Terms, such as those defined in commonly used dictionaries, should be construed as having a meaning that is consistent with their meaning in the context of the relevant art and are not to be construed in an idealized or overly formal sense unless expressly so defined herein.

Furthermore, terms used in the exemplary embodiments of the present invention are intended to explain the exemplary embodiments and are not intended to limit the present invention.

As used herein, the singular forms "a," "an" and "the" are intended to include the plural forms as well, unless the context clearly indicates otherwise, and when a term is defined as at least one (or one or more) among "A and B, C, the term includes any and all combinations of one or more of the associated listed items.

Furthermore, in explaining elements of the exemplary embodiments of the present invention, the terms "first," "second," "A", "B", (a), (b) and the like may be used. These terms herein are rather simply used to distinguish one element from another and do not limit any essence, sequence or order of relevant elements based on the terms.

Furthermore, when an element is 'coupled', 'joined' or 'connected' to other element, "coupled", "joined" and "connected" may not only mean that two or more elements directly contact each other but may also mean that two or more elements are indirectly joined together via another element or intermediate elements Furthermore, when elements are formed or arranged "above (upper)" or "beneath (below),", it will be understood that "above (upper)" or "beneath (below)," may include not only that two elements are mutually directly contacted but also include that one or more elements are formed or arranged between two or more elements. Furthermore, if the device in the figures is turned over, elements described as "above (upper)" or "beneath (below)," other elements, it would then be oriented "above" or "below" the other elements or features. Thus, the exemplary term "below" can encompass both an orientation of above and below.

FIG. 1 illustrates an imaging process according to an exemplary embodiment of the present invention.

The imaging process according to an exemplary embodiment of the present invention may be used on an imaging apparatus using a learned convolutional neural network, a camera module, an imaging method and an imaging system.

The imaging apparatus according to an exemplary embodiment of the present invention may include an input unit for receiving first Bayer data having a first resolution and a noise level, and a convolutional neural network for outputting second Bayer data having a second resolution by using the noise level and the first Bayer data.

The imaging apparatus may include a pipelined processor, and may also include a convolutional neural network so learned as to generate a second Bayer data from the noise level and the first Bayer data.

Now, hereinafter, the imaging process using the convolutional neural network will be described in detail with reference to FIG. 1.

The convolutional neural network according to an exemplary embodiment of the present invention may be so learned as to generate a second Bayer data having a second resolution by receiving a first Bayer data having a first resolution and a noise level.

The learned convolutional neural network may generate a second Bayer data by receiving a first Bayer data and a noise level. Here, the first Bayer data may be a data having a first resolution, and the second Bayer data may be a data having a second resolution. Alternatively, the second Bayer data may be a Bayer data having a noise smaller than that of the first Bayer data. Furthermore, the second Bayer data having a second resolution may be generated from a predetermined noise level and a first Bayer data having a first resolution through the learned convolutional neural network. Here, the first resolution may have a resolution different from that of the second resolution, and the second resolution may be a resolution higher than that of the first resolution. For example, a Bayer data of high resolution may be generated from a low resolution Bayer data generated from a low illuminance.

The second Bayer data having a second resolution may be outputted using the learned convolutional neural network, whereby there is no need of changing the set-up of image sensor such as zoom magnification, aperture and shutter speed and using an image sensor having a high resolution. A high resolution Bayer data may be outputted without recourse to image sensor of high specification and increased noises such as glares and blurs that may be generated while the set-up of image sensor is changed.

The imaging process according to an exemplary embodiment of the present invention may be performed by an input unit (110) for receiving first Bayer data (101) having a first resolution and a noise level (102), and a convolutional neural network (120) for outputting second Bayer data (103) having a second resolution by using the noise level (102) and the first Bayer data (101).

The input unit (110) may receive the first Bayer data (101) and the noise level (102). Here, the first Bayer data (101) is a raw data outputted by being generated by an image sensor (140) and may include much information compared with an RGB image data generated by performing the image process. The first Bayer data (101), as shown in FIG. 2, may be received by being generated by the image sensor (140).

The image sensor (140) may include such image sensors as a CMOS (Complementary Metal Oxide Semiconductor) or a CCD (Charge Coupled Device) that changes a light inputted through a lens of a camera module to an electric signal. The image sensor (140) may generate a first Bayer data that includes information of Bayer Pattern through a color filter of obtained image. At this time, the first Bayer data (101) may have a first resolution in response to a zoom magnification set up while a specification of image sensor (140) or a relevant image is generated.

When the first Bayer data (101) is generated, the image sensor (140) may amplify the first Bayer data (101) through an amplifier by applying a gain in order to improve a low illuminance under an environment that generates a relevant first Bayer data. At this time, noise included in a data is also increased during amplification through an amplifier. The image sensor (140) may receive a noise level from an AP (application Processor, 130) and may output a first Bayer data amplified by amplifying the first Bayer data using the amplifier in response to the received noise level.

The noise level (102) may include a gain of an amplifier, and may be changed in value thereof in response to a specification of an amplifier included in the image sensor (140). For example, when an amplifier has a gain of 1 to 128, the noise level (102) may be one value of the 1 to 128. Here, the gain means that an exposure is shorter by 1/gain relative to a maximum exposure. For example, in case of noise level 2, that is, when the gain is 2, it means that an exposure is ½ of maximum exposure, and at this time, the first Bayer data may be outputted by being two times amplified through application of gain 2.

The input unit (110) may receive the first Bayer data (101) and the noise level (102) respectively. As shown in FIG. 2, a first Bayer data input unit may receive the first Bayer data (101) from the image sensor (140), and a noise level input unit (110) may receive the noise level (102) from the AP AP (130). At this time, the first Bayer data input unit (110) may receive the first Bayer data (101) from the image sensor (140) through an MIPI (Mobile Industry Processor Interface). The noise level input unit (110) may receive the noise level (102) from the AP (130) through I2C (channel).

The noise level input unit (110) may receive a noise level (102) from the AP (130) at an integer value of 1-16. For example, when the noise level scope is 1-128, the noise level input unit (110) may receive the noise level by dividing a 7-digit integer value. The image sensor (140) may also receive the noise level (102) from the AP (130), where the noise level input unit (110) may also receive the noise level (102) from the image sensor (140).

The first Bayer data (101) and the noise level (102) received by the input unit (110) may be inputted to the convolutional neural network (120), where the convolutional neural network (120) may output a second Bayer data (103) having a second resolution from the first Bayer data (101) having a noise level (102) and a first resolution.

The convolutional neural network (120) learned by training that outputs the second Bayer data (103) having the second resolution from the first Bayer data having a noise level (102) and a first resolution may receive the first Bayer data (101) having the noise level (102) and the first resolution to output the second Bayer data (103) having the second resolution.

The convolutional neural network (120) may be at least one of the models of FCN (Fully Convolutional Network), U-Net, MobileNet, RDN (Residual Dense Network) and RCAN (Residual Channel Attention Network). It should be apparent that other various models may be utilized in addition thereto.

The first Bayer data (101) inputted to the convolutional neural network (120) may be a Bayer data having a first resolution by being generated from a particular zoom magnification, and the second Bayer data (103) outputted from the convolutional neural network (120) may be a Bayer data different from the first Bayer data in terms of resolution. The second resolution of the second Bayer data (103) may be higher than the first resolution of the first Bayer data (101). Alternatively, the second resolution may be lower than the first resolution.

When the second resolution is higher than the first resolution, that is, when a high resolution Bayer data is generated from a low resolution Bayer data, noises included in the low resolution Bayer data may be different depending on the noise level (102) applied when the low resolution Bayer data is generated, where quality may be changed depending on the noise level (102) when the high resolution Bayer data is generated using the convolutional neural network (120) that uses no noise level (102).

Particularly, when the high resolution Bayer data is generated from a low resolution Bayer data of low illuminance, lots of noises may be included. As a result, in order to generate a high resolution Bayer data from a low resolution Bayer data and to simultaneously generate a quality high resolution Bayer data by improving noises caused by amplification of image brightness, the low resolution Bayer data and the noise level may be received together to generate a high resolution Bayer data from the low resolution Bayer data by adaptively changing the parameter to the noise level.

In other words, the convolutional neural network (120) may output by generating a high resolution second Bayer data from a low resolution first Bayer data.

The convolutional neural network (120) may be trained (learned) to output a second Bayer data having a second resolution based on the first Bayer data and the noise level in order to generate the second Bayer data of high resolution. The training set for training (learning) the convolutional neural network may be formed with a predetermined noise level, a first Bayer data having a relevant noise level and a first resolution and a second Bayer data having a second resolution.

The convolutional neural network (120) may improve the low illuminance from a predetermined noise level forming a training set and a first Bayer data having a 1 resolution from a relevant noise level, and may be trained for a Bayer data outputted by being increased in resolution to be equal to the second Bayer data forming the training set. The process for training the convolutional neural network (120) will be explained in detail hereinafter.

FIG. 3 is a schematic view illustrating an imaging-performing pipelined processor using the learned convolutional neural network (120), where the pipelined processor may be formed by an input unit (110), a block extractor (310), a convolutional neural network (120), a block buffer (320) and an output unit (330). The pipelined processor of FIG. 3 may perform an imaging process of FIGS. 1 and 2 using the learned convolutional neural network.

When the input unit (110) receives the first Bayer data, the first Bayer data may be inputted in various formats. For example, the first Bayer data may be inputted with a format having a block size of 1×N, N×N, N×M.

For efficient and speedy process, the block extractor (310) may extract the format of the first Bayer data in the 1×N shape of block. The convolutional neural network (120) learned to output the second Bayer data from the noise level and the first Bayer data may receive a block extracted from the block extractor (310) to output the second Bayer data from the first Bayer data. The 1×N block image inputted from the convolutional neural network may be outputted in a high resolution, i.e., a size-enlarged s×sN block where the s×sN block may be stored in the block buffer (320) to generate a second Bayer data and the second Bayer data may be outputted from the output unit (330).

The convolutional neural network (120) may be formed as shown in FIG. 4. The convolutional neural network (120) may generate a second Bayer data from a first Bayer data through a plurality of convolutional layers (410 to 420). For example, the convolutional layer may include a layer that performs a convolutional calculation or de-convolutional calculation. Each convolutional layer of the plurality of convolutional layers may perform he convolution using a variable parameter that changes in response to a fixed parameter or noise level.

The convolutional neural network (120) may sort or classify the neural network by reducing and distorting the amount of data by repeating the convolution and the sub-sampling. That is, the convolutional neural network (120) may output a classification result through characteristic extraction and classification behavior, through which an image to be embodied can be outputted.

To be more specific, as shown in FIG. 5, the convolution and the sub-sampling may be performed on an area desired to be magnified based on the first Bayer data having a first resolution. The sub-sampling means a process of reducing the size of image. At this time, the sub-sampling may use Max Pool method. The Max Pool is a technique of selecting a maximum value from a relevant area, and similar to a reaction to a signal where a neuron is the largest. The sub-sampling has advantages of reducing the noise and increasing the learning speed. When the convolution and the sub-sampling are performed, a plurality of data may be outputted. Here, the plurality of data may be the characteristic (feature) map. Thereafter, a plurality of image data having mutually different features may be outputted using an Up Scale method based on the plurality of image data. The Up Scale method means to increase the image by r*r times in terms of scale using mutually different r^2 pieces of filters. When a plurality of data is outputted in response to the Up Scale, re-combination may be made based on these image data to finally output a second Bayer data having the second resolution.

Alternatively, the convolutional neural network (120) may include at least one contracting path and expanding path. Here, the contracting path may include at least any one of the convolution (cony), ReLU and Pooling, and the expanding path may be performed using the feature and spatial information or through concatenation with high resolution feature.

The convolutional neural network (120) may use filters learned in response to the noise level. Each filter may be formed with a parameter learned in response to the noise level. The convolution may be performed using the parameter matching to the inputted noise level.

Alternatively, the convolutional neural network (120) may be such that parameters may be changed in response to the noise level when the convolution is performed at each convolution layer. For example, while the learned filter may be used at each convolution layer, a fixed parameter (411) using a fixed parameter and a variable filter (421) using a variable parameter may be included. The variable parameter of variable filter (421) may be changed based on the noise level. The convolution layer that is not affected by the noise level among the convolution layers may perform the convolution using the fixed parameter, and the convolution layer that is affected by the noise level may perform the convolution using the variable parameter, whereby a second Bayer data of better quality can be generated and outputted by adaptively applying the parameter to the noise level. Here, the better quality means that numerical figures (readings) for noises and distortions are lower compared with the original version.

The convolution layers (410, 420) included in the convolutional neural network (120) may use the fixed filter (411) or variable filter (421). At least any one of the convolution layer among the plurality of convolution layers (410, 420) may use the variable filter (421). The parameter of variable filter (421) may be changed depending on the noise level. A parameter converter (430) may be included in order to use the variable parameter that changes in response to the noise level. The noise level may be inputted to the parameter converter (430), where the parameter converter (430) may generate one or more variable parameters to be applied to the variable filter (421) depending on the inputted noise level. The parameter converter (430) may be embodied by a function including a specific formula, a method that reads a specific value from a list table stored in a memory in response to a specific value and/or a sub-neural network (Sub-NN) that outputs the parameters.

The parameter converter (430) may perform the convolution relative to the noise level to generate a parameter of variable filter (421) that is applied to the convolution layer. For example, when the variable filter is formed with 3×1 parameters, the convolution may be performed to generate three (3) parameters as shown in FIG. 6. The 3×1 vector may be outputted by passing the layers (620, 630) having the noise level-fixed filter parameter, whereby parameter of the variable filter (421) may be updated. At this time, the parameter converter (430) may include at least one layer out of the fully connected layer or convolution layer.

When the convolution layer using the variable parameter is formed with a plural number, the parameter converter (430) may generate a plurality of variable parameters to allow each convolution layer using the variable parameter to use mutually different variable parameters.

The parameter converter (430) may generate a plurality of parameter sets from the noise level. As a result, the generated second Bayer data may be increased in quality by using mutually different convolution layers for each convolution layer instead of the same parameter generated from the noise level relative to the plurality of convolution layers.

The parameter converter (430) may generate parameters by converting the noise levels to vector forms including information of each convolution when the convolution layers using the variable parameters are plural. For example, when mutually different variable parameters are applied to two or more convolution layers, inputs are inputted in the 1×2 or 2×1 vector forms of (noise level, layer index) forms, and the mutually different parameters thus generated may be applied to variable layers of each convolution layer.

The training of convolutional neural network (120) may be performed based on a training set including a predetermined noise level, a relevant noise level, a first Bayer data having a first resolution and a second Bayer data having a second resolution. The convolutional neural network (120) may be so learned as to output the second Bayer data having the second resolution based on the first Bayer data and the noise level.

The training of convolutional neural network (120) may be performed through the repeated trainings as illustrated in FIG. 7. The training may be performed using the first Bayer data having mutually different resolutions and second Bayer data. Here, the first Bayer data may be inputted into convolutional neural network as input data (X1), and the second Bayer data as GT (Ground Truth, Z) may play the role of comparing the output data (Y) outputted from the convolutional neural network. The GT (Ground Truth) means the most ideal data that may be generated from the convolutional neural network during the training. The convolutional neural network may be repeatedly trained to allow the output data (Y) to come closer to the GT (Z).

At this time, the noise level (X2) may be inputted along with the input data (X1) to perform the training of the relevant noise level (X2). That is, the convolutional neural network (120) may be trained using a training set including one noise level in a plurality of noise levels, a relevant noise level, a first Bayer data having a first resolution and a second Bayer data having a second resolution.

Here, the first Bayer data and the second Bayer data used for training may be Bayer data having mutually different resolutions. The resolution means the number of pixels for each unit area, and the second Bayer data may have a higher resolution than the first resolution of the first Bayer data. For example, the first Bayer data may have resolutions of 640×480, 1280×720 and 1920×1080, and the second Bayer data may have resolutions 2560×1440, 3840×2160 and 7680×4320. The second Bayer data may not have specific resolutions but have various resolutions different from the first Bayer data in terms of resolutions.

Furthermore, the first Bayer data and the second Bayer data used for training may have mutually different noise levels. The noise level of second Bayer data may be smaller than that of the first Bayer data. Here, the size of the noise level may mean a gain of an amplifier applied to a specific exposure value, and may mean a relevant exposure value. For example, when a gain is 1 to 128, a value of 1 to 128 may be inputted as a noise level. Here, when the gain is 1, it means that no noise exists, and when the gain is n, it means that exposure is shorter by 1/n times than when the gain is 1, and the gain is n times. The second Bayer data may be a Bayer data having a noise level of 1, and the first Bayer data may be a Bayer data having any one noise level among 2 to 128. The noise level of first Bayer data may have a predetermined noise level lower than the noise level of second Bayer data of not being of 1.

The training may be performed using the loss function and optimizer.

The repeated training may be performed to allow the output data (Y) to come closer to GT (Z) while parameters are adjusted using the loss function and optimizer through comparative analysis of output data (Y) and GT (Z) outputted by the convolutional neural network by receiving the input data (X1) and noise level (X2) as input data.

GT (Z) means an ideal Bayer data having no noise, and may further reduce the noise by doing cumulative average of multiple frames, if necessary. GT (Z) may be a Bayer data having no noise, that is, a Bayer data with noise level of 1, and may be data of long exposure or may be a data whose exposure is maximum value.

Here, the input data (X1) may be a data that has lowered the resolution by down-sampling the GT (Z). At this time, the degree of down-sampling may be changed depending on a difference between the first resolution and the second resolution, that is, a zoom ratio for performing the digital zoom. For example, in case a difference between the first resolution and the second resolution is 3 times, and the resolution of GT (Z) is 9MP (Mega Pixel), the resolution of input data (X1) must be 1MP, whereby the resolution of output data (Y) increased in its resolution by 3 times through convolutional neural network (120) becomes 9MP, and whereby the input data (Y) of 1MP may be generated by down-sampling GT (Z) of 9M by ⅑. The input data (X1) having a relevant noise level and a relevant resolution may be generated by applying noise level (X2) to the input data (Y) during down-sampling. Regarding the exposure applied to the input data (X1) during generation of GT (Z), the exposure is decreased by 1/n times in response to the noise level n, and the gain corresponding to the noise level is applied by n times to thereby generate the input data (X1) having the noise based on the noise level (X2). Alternatively, the noise included in the Bayer data having the relevant noise level may be applied to the input data (X1). For example, the input data (X1) may be generated by applying a noise effect including glares or blurs corresponding to the noise level.

At this time, the GT (Z) may be a Bayer data having a maximum resolution among the realizable resolutions, a second Bayer data having the second resolution may be generated by sampling a Bayer data of maximum resolution based on the realizable second resolution, which may be used as GT (Z). Alternatively, respective trainings may be performed by using a plurality of second Bayer data having various resolutions by way of GT (Z).

Even for the noise level, the GT (Z) may be a Bayer data generated by maximum exposure. Alternatively, when the second Bayer data to be outputted by the convolutional neural network is a Bayer data having a predetermined noise level of no maximum exposure, noise may be applied to the Bayer data of maximum exposure in response to the noise level to be realized to generate a second Bayer data having a relevant noise level, which may be then used as GT(Z). Alternatively, a plurality of second Bayer data having various noise levels may be used as GT(Z) to perform respective trainings.

Alternatively, a first Bayer data and second Bayer data having mutually different resolutions may be respectively generated for the same subject and the same scene to be used as input data (X1) and GT(Z). At this time, in order to generate a Bayer data for the same scene, a fixable device such as a tripod may be used on a camera apparatus including an image sensor. The same scene may be captured by setting up the maximum exposure and maximum resolution or second resolution to generate the second Bayer data having the second resolution, and may be captured by setting up with noise level and first resolution corresponding to the data to be inputted during the training to thereby generate a first Bayer data having a first resolution.

The output data (Y) and GT(Z) outputted in response to the input of input data (X1) and noise level (X2) may be comparatively analyzed to calculate a difference between the said two data, and feedback may be given to the parameters of convolution filter to a direction that reduces the difference between the said two data. At this time, the difference between the two data may be calculated through the MSE (Mean Squared Error) method which is one of the loss functions. In addition thereto, various loss functions including the CEE (Cross Entropy Error) may be used. Feedback may be given by methods of changing or deleting the parameters or generating a new parameter after analyzing the parameter that affects the output data to thereby make no difference between GT(Z) and the output data (Y) which is an actual output data.

As shown in FIG. 8, let's assume that, for example, a total of three (3) convolution layers (L1, L2, L3) exists and a total of eight (8) parameters (P11, P12, P13, P21, P22, P31, P32) exists on each of the convolution layers. In this case, when the parameters are changed to a direction that increases the value of P22 parameter, and a difference between the output data (Y) and GT(Z) has increased, the feedback may be learned to a direction that reduces the P22 parameter. Conversely, when the parameters are changed to a direction that increases the value of P33 parameter to thereby decrease the difference between the output data (Y) and GT(Z), the feedback may be learned to a direction that increases the P33 parameter.

The deep learning training may be performed for a case where an output result and comparison target are existent, and learning is performed through comparison with the comparison target, as shown in FIG. 8 and may perform the training using comparison value. In this case, a current environment state may be transmitted to a processor performing the deep learning training while first perceiving a surrounding environment. The processor may perform an action matching thereto, and the environment in turn may notify the compensation value to the processor. Furthermore, the processor may select the action that maximizes the compensation value. The training may be performed by repeatedly progressing the learning through these processes. In addition, the deep learning training may be performed by various methods.

Furthermore, an imaging apparatus according to another exemplary embodiment of the present invention may include an input unit for receiving a first Bayer data and a noise level and a convolutional neural network for outputting second Bayer data based on the noise level and the first Bayer data, where noise of the second Bayer data may be characterized by being smaller than the noise of first Bayer data.

Furthermore, an imaging apparatus according to still another exemplary embodiment of the present invention may include an input unit for receiving a first Bayer data and a noise level and a convolutional neural network for outputting second Bayer data based on the noise level and the first Bayer data, where resolution of the second Bayer data may be characterized by being larger than the resolution of first Bayer data.

A imaging process using convolutional neural network learned according to an exemplary embodiment of the present invention may be applied to the imaging apparatus of FIG. 8, a recording medium of FIG. 9, a camera module of FIG. 10, a computing apparatus of FIG. 12 and an imaging method of FIG. 13. Detailed descriptions of imaging process of each exemplary embodiment may correspond to those of imaging processes of FIGS. 1 to 7, and therefore, redundant explanations thereto will be omitted.

FIG. 8 is a block diagram of imaging apparatus (100) according to an exemplary embodiment of the present invention. The imaging apparatus according to an exemplary embodiment of the present invention may include at least one processor (130) and a memory (140) storing a command processed by the processor (130), in receiving a first Bayer data having a first resolution and a noise level, and outputting a second Bayer data having a second resolution using the first Bayer data and the noise level through the learned convolutional neural network.

The processor (130) may receive the first Bayer data having the first resolution and noise level in response to the command stored in the memory (140), and output the second Bayer data having the second resolution using the first Bayer data and noise level through the learned convolutional neural network.

The first Bayer data (101) and the noise level (102) may be respectively inputted into the convolutional neural network (120). Here, the first Bayer data (101) may be a data outputted from an image sensor, and the data outputted from the image sensor may be a data amplified based on the noise level (102). The noise level (102) may be inputted from an image sensor or an AP(Application Processor).

The convolutional neural network (120) may be stored in a memory (140). The processor (130) may generate a second Bayer data from the first Bayer data in response to the command stored in the memory (140) using the convolutional neural network (120). The convolutional neural network (120) may be such that parameters are changed in response to the noise level.

The convolutional neural network (120) may be at least one model out of FCN(Fully Convolutional Network), U-Net, MobileNet, RDN(Residual Dense Network), and RCAN(Residual Channel Attention Network), and may be so learned as to output the second Bayer data having the second resolution based on the first Bayer data and the noise level.

A training set of convolutional neural network (120) may include a predetermined noise level, a relevant noise level, a first Bayer data having a first resolution and a second Bayer data having a second resolution.

The convolutional neural network (120) may generate the second Bayer data from the first Bayer data through a plurality of convolution layers while each convolution layer of the plurality of convolution layers may use learned filters in response to the noise level, Each filter may be formed with parameters learned in response to the noise level. The convolution may be performed using the parameter matching to the noise level.

Furthermore, when the convolution is performed at each convolution layer, the convolutional neural network (120) may be such that the parameter is changed in response to the noise level. For example, the convolution may be performed using a fixed parameter or a variable parameter that changes in response to the noise level while using the filter learned for each convolution layer.

In order to generate a variable parameter, the convolutional neural network (120) may include a parameter converter for generating one or more variable parameters from the noise level, and the variable parameter generated from the noise level may be changed at each convolution layer using the variable parameter when the convolution layer using the variable parameter is formed in plural number.

The second resolution may be higher than the first resolution, and the noise of the second Bayer data may be smaller than the noise of the first Bayer data.

FIG. 9 is a block diagram of a recording medium (900) for outputting a second Bayer data from a first Bayer data using the convolutional neural network according to an exemplary embodiment of the present invention. The recording medium (900) according to an exemplary embodiment of the present invention may store a plurality of modules for software to be performed by the processor (130) of the imaging apparatus. The recording medium (900) may be a recording medium readable by a computer, or a memory of an imaging apparatus. The recording medium (900) may be connected with the processor (130) via a bus (960), and each module stored in the recording medium (900) may be performed by the processor (130). The recording medium (900) may be formed with an input module (910), a convolutional neural network module (930), and an output module (950), and may further include a block extraction module (920) and a block buffer module (940). In addition thereto, it should be apparent that the recording medium may further include other elements for imaging and/or other operations.

The input module (910) may receive a noise level and a first Bayer data, the block extraction module (920) may extract the first Bayer data by unit block, and the convolutional neural network module (930) may output the second Bayer data (block) from the noise level and the first Bayer data (block). The block buffer module (940) may generate a second Bayer data using the block of the second Bayer data, and the output module (950) may output a second Bayer data.

FIG. 10 is a block diagram of a camera module (1000) outputting a second Bayer data from a first Bayer data using the convolutional neural network according to an exemplary embodiment of the present invention. The camera module (1000) according to an exemplary embodiment of the present invention may include an image sensor (1010) generating a first Bayer data having a first resolution in response to noise level and a convolutional neural network (1020) outputting a second Bayer data having a second resolution using the first Bayer data (1001) and the noise level (1002). Here, the convolutional neural network (1020) may be such that parameters change in response to the noise level (1002).

The camera module may be embodied as shown in FIG. 11. In order to generate a Bayer data by receiving a light, the camera module (1100) may include a lens (1110), an image sensor (1120), a filter (1130), an actuator (1150), a driver IC (1160) for driving the actuator (1150), a Hall sensor (1140) for sensing information for driving and a gyro sensor (1170). The image (1120) may include an amplifier (1121) that operates by receiving an exposure value and a gain from an AP (1190) through 12C, and amplifies a gain of data in response to the gain value. The first Bayer data which is a raw sensor data amplified at the image sensor (1120) by the amplifier (1121) in response to the gain may be inputted into a deep learning engine chip (1180) including the learned convolutional neural network.

The gain value may be inputted into the deep learning engine chip (1180) as a noise level. The low illuminance may be improved through the convolutional neural network learned by the deep learning engine chip (1180), and a second Bayer data which is a resolution-increased SR image data may be outputted. The deep learning engine chip (1180) may receive the noise level from the AP (1190) through 12C.

FIG. 12 is a block diagram of computing apparatus (1200) outputting a second Bayer data from a first Bayer data using the convolutional neural network according to an exemplary embodiment of the present invention. The computing apparatus (1200) according to an exemplary embodiment of the present invention may be realized by various shapes including a user terminal, a PC terminal, a wearable device, a security camera system, a film camera and/or a server.

The computing apparatus (1200) according to an exemplary embodiment of the present invention may include a CPU (1201), a camera (1202), and an SE generator (112) performing the imaging. Here, the SE generator (112)

according to an exemplary embodiment of the present invention may be formed with a raw sensor data input unit (1204), a block extraction unit (1205), a learned CNN (1206), a block buffer(1207) and an SR image data output unit (1208). The learned CNN (1206) may be trained by a CNN training unit (1213).

In addition thereto, the computing apparatus (1200) may be formed with a memory device (1209), a driver (1210), a storage (1211), a GPU (1212), a post processor (1214) performing an image process, an I/O device interface (1215) transmitting to and/or receiving data from other I/O device (1216), a display interface (1217) and an NIC (1219) for communication with the network (1220).

FIG. 13 is a flowchart of an image processing method according to an exemplary embodiment of the present invention, and FIG. 14 is a flowchart of an image processing method according to another exemplary embodiment of the present invention.

The imaging method in the learned the convolutional neural network may be such that a first Bayer data having a first resolution and a noise level are received at step S11, and a second Bayer data having a second resolution is outputted using the first Bayer data and the noise level through the learned the convolutional neural network at step S12.

The convolutional neural network may use a filter learned in response to the noise level. Each filter may be formed with a parameter learned in response to the noise level. The convolution may be performed using the parameter matched to the inputted noise level.

Furthermore, the convolutional neural network may be such that parameters change in response to the noise level when the convolution is performed at each convolution layer. For example, a fixed filter using a fixed parameter and a variable filter using a variable parameter may be included while using a filter learned at each convolution layer, where the variable parameter of variable filter may be changed in response to the noise level.

In using the variable parameter, subsequent to the input at S11, the parameter of the convolutional neural network may be changed in response to the noise level at S21, and the convolution may be performed at the convolutional neural network at S12.

While S12 outputting the second Bayer data may generate the second Bayer data from the first Bayer data and the noise level through the plurality of convolution layers, each convolution layer of the plurality of convolution layers may perform the convolution using the variable parameter that changes in response to the fixed parameter or the noise level.

Meantime, the above-described exemplary embodiments of the present invention can be implemented in a program recorded medium as computer-readable codes. The computer-readable media may include all kinds of recording devices in which data readable by a computer system are stored.

The computer-readable media may include all kinds of recording devices in which data readable by a computer system are stored. The computer-readable media include ROM, RAM, CD-ROM, magnetic tapes, floppy discs, optical data storage devices, and the like for example. Further, a computer readable recording medium recorded with programs as described above may be distributed to a computer system connected through a network and thus stores and executes a computer readable code by a distributed manner.

Furthermore, functional programs, codes and code segments for implementing the present invention may be easily inferred by programmers by those skilled in the art to which the present invention belongs.

Although the abovementioned embodiments according to the present invention have been described in detail with reference to the above specific examples, the embodiments are, however, intended to be illustrative only, and thereby do not limit the scope of protection of the present invention, and it should be understood that numerous other modifications and embodiments can be devised by those skilled in the art that will fall within the spirit and scope of the principles of this disclosure.

Thus, the foregoing detailed explanation may be considered not as being of limited interpretation but as being exemplary. The scope of the present invention may be determined by rational interpretation of attached claims, and all changes within the equivalent scope of the present invention are included within the scope of the present invention.

The invention claimed is:

1. An imaging apparatus comprising:
an input unit configured to receive a first Bayer data having a first resolution and a noise level; and
a convolutional neural network configured to receive the first Bayer data and the noise level and to output a second Bayer data having a second resolution based on the noise level and the first Bayer data,
wherein the convolutional neural network comprises a plurality of convolution layers, and the plurality of convolution layers includes a first convolution layer to perform a first convolution and a second convolution layer to perform a second convolution and output the second Bayer data having the second resolution,
the first convolution layer includes a fixed filter for performing the first convolution using a fixed parameter,
the second convolution layer includes a variable filter for performing the second convolution using a variable parameter that changes depending on the noise level.

2. The imaging apparatus according to claim 1, wherein the first Bayer data and the noise level are respectively inputted to the convolutional neural network.

3. The imaging apparatus according to claim 1, wherein the first Bayer data is a data outputted from an image sensor.

4. The imaging apparatus according to claim 3, wherein the data outputted from the image sensor is a data amplified based on the noise level.

5. The imaging apparatus according to claim 1, wherein the noise level is inputted from the image sensor or an AP (Application Processor).

6. The imaging apparatus according to claim 1, wherein the convolutional neural network is so learned as to output the second Bayer data having the second resolution based on the first Bayer data and the noise level.

7. The imaging apparatus according to claim 1, wherein training set of the convolutional neural network comprises a predetermined noise level, the first Bayer data having a relevant noise level and the first resolution, and the second Bayer data having the second resolution.

8. The imaging apparatus according to claim 1, wherein the second resolution is higher than the first resolution.

9. The imaging apparatus according to claim 1, wherein noise of the second Bayer data is smaller than noise of the first Bayer data.

10. The imaging apparatus according to claim 1, comprising:
a block extractor configured to extract format of the first Bayer data in a 1×N shape of block; and a block buffer configured to store a size-enlarged sxsN block outputted from the convolutional neural network and generate the second Bayer data.

11. The imaging apparatus according to claim 10, wherein the convolutional neural network receives the block extracted from the block extractor to output the second Bayer data from the first Bayer data.

12. An image apparatus comprising:
at least one processor; and
a memory storing a command processed by the processor,
wherein the processor, in response to the command stored in the memory, receives a first Bayer data having a first resolution and a noise level, and outputs a second Bayer data having a second resolution using the first Bayer data and the noise level through a learned convolutional neural network,
wherein the convolutional neural network comprises a plurality of convolution layers, and the plurality of convolution layers includes a first convolution layer to perform a first convolution and a second convolution layer to perform a second convolution which outputs the second Bayer data having the second resolution,
the first convolution layer includes a fixed filter for performing the first convolution using a fixed parameter, and
the second convolution layer includes a variable filter for performing the second convolution which outputs the second Bayer data by using a variable parameter that changes depending on the noise level.

13. The imaging apparatus according to claim 12, wherein the first Bayer data and the noise level are respectively inputted to the convolutional neural network from an image sensor.

14. The imaging apparatus according to claim 13, wherein the data outputted from the image sensor is a data amplified based on the noise level.

15. The imaging apparatus according to claim 12, wherein the noise level is inputted from the image sensor or an AP (Application Processor).

16. The imaging apparatus according to claim 12, wherein the convolutional neural network is so learned as to output the second Bayer data having the second resolution based on the first Bayer data and the noise level.

17. The imaging apparatus according to claim 12, wherein training set of the convolutional neural network comprises a predetermined noise level, the first Bayer data having a relevant noise level and the first resolution, and the second Bayer data having the second resolution.

18. A camera module comprising:
an image sensor configured to generate a first Bayer data having a first resolution in response to a noise level; and
a convolutional neural network configured to output a second Bayer data having a second resolution using the first Bayer data and the noise level,
wherein the convolutional neural network comprises a plurality of convolution layers, and the plurality of convolution layers includes a first convolution layer to perform a first convolution and a second convolution layer to perform a second convolution which outputs the second Bayer data having the second resolution,
the first convolution layer includes a fixed filter for performing the first convolution using a fixed parameter, and
the second convolution layer includes a variable filter for performing the second convolution which outputs the second Bayer data by using a variable parameter that changes depending on the noise level.

19. The camera module according to claim 18, wherein the data outputted from the image sensor is a data amplified based on the noise level.

20. The camera module according to claim 18, wherein the convolutional neural network is so learned as to output the second Bayer data having the second resolution based on the first Bayer data and the noise level.

* * * * *